(12) United States Patent
Cahill (10) Patent No.: US 11,398,917 B2
(45) Date of Patent: Jul. 26, 2022

(54) METHOD AND SYSTEM FOR IDENTIFICATION VERIFICATION

(71) Applicant: Kelley Cahill, Huntington Beach, CA (US)

(72) Inventor: Kelley Cahill, Huntington Beach, CA (US)

(*) Notice: Subject to any disclaimer, the term of this patent is extended or adjusted under 35 U.S.C. 154(b) by 209 days.

(21) Appl. No.: 16/535,897

(22) Filed: Aug. 8, 2019

(65) Prior Publication Data

US 2020/0052906 A1 Feb. 13, 2020

Related U.S. Application Data

(60) Provisional application No. 62/715,905, filed on Aug. 8, 2018.

(51) Int. Cl.
*H04L 9/32* (2006.01)
*G06F 16/903* (2019.01)
*G06V 40/70* (2022.01)

(52) U.S. Cl.
CPC ...... *H04L 9/3263* (2013.01); *G06F 16/90335* (2019.01); *G06V 40/70* (2022.01); *H04L 9/3239* (2013.01); *H04L 2209/38* (2013.01)

(58) Field of Classification Search
CPC .......... G06F 16/90335; G06F 16/903; H04L 9/3263; H04L 9/0643; H04L 9/3239; H04L 9/3231; H04L 2209/38; G06K 9/00892; G06K 9/00926; G06K 9/00885; G06K 9/00979; G06K 9/00; G06V 40/70
See application file for complete search history.

(56) References Cited

U.S. PATENT DOCUMENTS

| | | | |
|---|---|---|---|
| 2018/0216946 A1* | 8/2018 | Gueye | H04W 4/029 |
| 2018/0336286 A1* | 11/2018 | Shah | G06Q 10/10 |
| 2019/0096210 A1* | 3/2019 | Jarvis | G07C 9/257 |
| 2019/0319948 A1* | 10/2019 | Triola | H04L 9/3218 |

* cited by examiner

*Primary Examiner* — Tongoc Tran
(74) *Attorney, Agent, or Firm* — Stetina Brunda Garred and Brucker (57) ABSTRACT

A method for verifying a person's identity includes receiving a registration request from an electronic device, the request including identifying information associated with a presumed identity of a person and captured metadata indicative of a timing of user inputs entered to the electronic device by the person during a session associated with the request, querying one or more trusted databases to obtain background data item(s) associated with the presumed identity, receiving, from a biometric reader, biometric data item(s) captured from the person during the session, storing a data record associating the identifying information, captured metadata, background data item(s), and biometric data item(s), calculating a hash as a function of the identifying information, captured metadata, background data item(s), biometric data item(s), storing the hash in a block of a blockchain, deriving a score from the captured metadata and background data item(s), and generating an embeddable digital badge based on the score.

20 Claims, 9 Drawing Sheets

| # | IDENTIFYING INFORMATION | METADATA / INTEGRITY | BACKGROUND DATA | SOCIAL MEDIA DATA | BIOMETRIC DATA |
|---|---|---|---|---|---|
| ID1 | | | | | |
| ID2 | | | | | |
| ... | | | ... | ... | ... |
| IDn | | | | | |

METHOD AND SYSTEM FOR IDENTIFICATION VERIFICATION

CROSS-REFERENCE TO RELATED APPLICATIONS

This application relates to and claims the benefit of U.S. Provisional Patent Application No. 62/715,905, filed Aug. 8, 2018 and entitled "METHOD AND SYSTEM FOR IDENTIFICATION VERIFICATION," the entire disclosure of which is hereby incorporated by reference.

STATEMENT RE: FEDERALLY SPONSORED RESEARCH/DEVELOPMENT

Not Applicable

BACKGROUND

1. Technical Field

The present disclosure relates generally to identity verification and, more particularly, to the creation of an authoritative digital certification that a particular identity belongs to a person.

2. Related Art

Two-factor and three-factor identification are increasingly common measures taken to reduce the occurrence of identity theft. Unfortunately, once identity theft occurs, these systems do nothing to address the resulting criminal behavior. Take, for example, the recent prevalence of biometric-based identification systems such as CLEAR®, which asks each registrant to provide a fingerprint and iris scan to confirm that the person is who he says he is. A person with a copy of the legitimate person's traditional identification documents can simply pose as the legitimate person during registration and provide his own biometric data. As a result, such systems make a successful identity thief even more dangerous, as he can now convincingly demonstrate that the false identity belongs to him, making it possible for him to gain access to the legitimate person's assets while all the while hiding his own criminal record. In the social and dating world, such an identity thief may even represent a life-threatening danger to an unwitting victim.

BRIEF SUMMARY

The present disclosure contemplates various systems, methods, and apparatuses for overcoming the above drawbacks accompanying the related art. One aspect of the embodiments of the present disclosure is a non-transitory program storage medium on which are stored instructions executable by a processor or programmable circuit to perform operations for verifying a person's identity. The operations may include receiving a registration request from a first electronic device, the registration request including one or more items of identifying information associated with a presumed identity of a person and one or more items of captured metadata indicative of a timing of user inputs entered to the first electronic device by the person during a session associated with the registration request, querying one or more trusted databases based on the one or more items of identifying information to obtain one or more background data items associated with the presumed identity of the person, receiving, from a biometric reader, one or more biometric data items captured from the person during the session, storing a data record associating the one or more items of identifying information, the one or more items of captured metadata, the one or more background data items, and the one or more biometric data items, calculating a hash as a function of the one or more items of identifying information, the one or more items of captured metadata, the one or more background data items, and the one or more biometric data items, storing the hash in a block of a blockchain, deriving a score from the one or more items of captured metadata and the one or more background data items, and generating an embeddable digital badge based on the score.

The one or more items of identifying information may include one or more items selected from the group consisting of: a name, a date of birth, a street address, an email address, a phone number, a social media identifier, a social security number or portion thereof, and an image.

The operations may include prompting the person to answer questions derived from the one or more items of identifying information. The one or more items of captured metadata may include metadata indicative of a timing of the person's answers to the questions.

The registration request may include the person's responses to an integrity assessment.

The operations may include terminating a registration process based on the captured metadata prior to querying the one or more trusted databases. The operations may include preventing the person from submitting a new registration request in response to a termination of the registration process.

The one or more trusted databases may include a trusted database selected from the group consisting of: a department of motor vehicles (DMV) database and a Federal Bureau of Investigation (FBI) database.

The operations may include calling an application programming interface (API) associated with a social media provider to obtain one or more social media data items associated with the presumed identity of the person. The hash may be calculated as a function of the one or more social media data items. The one or more social media data items may be stored in association with the hash. The score may be further derived from the one or more social media data items.

The one or more biometric data items may include one or more items selected from the group consisting of: fingerprint data, iris scan data, facial recognition data, and voice recognition data.

The score may be further derived from either or both of the one or more items of identifying information and the one or more biometric data items.

The embeddable digital badge may be generated in response to the score being above a threshold.

The embeddable digital badge may contain a visual representation of the score.

The operations may include receiving an update request from the first electronic device, the update request including a login credential associated with the presumed identity of the person and one or more items of update data indicative of a change in the identifying information associated with the presumed identity of the person, storing the one or more items of update data in the data record, calculating a new hash as a function of the one or more items of update data and the hash stored in the blockchain, and storing the new hash in a new block of the blockchain.

The operations may include monitoring the one or more trusted databases for new or modified background data items associated with the presumed identity of the person, storing the new or modified background data items in the data record, calculating a new hash as a function of the new or modified background data items and the hash stored in the blockchain, storing the new hash in a new block of the blockchain, deriving a new score at least in part from the new or modified background data items, and updating the embeddable digital badge based on the new score. Updating the embeddable digital badge may include canceling the embeddable digital badge in response to the new score being below a threshold. The updated embeddable digital badge may contain a visual representation of the new score.

The operations may include receiving, from a second electronic device, a lookup request including a name of a person of interest, retrieving, based on the name of the person of interest, the one or more items of identifying information, the one or more items of captured metadata, the one or more background data items, and the one or more biometric data items stored in the data record, calculating a validation hash as a function of the retrieved data, searching the blockchain for a hash matching the validation hash, and, in response to a search result indicating that the validation hash matches a hash stored in the blockchain, outputting, to the second electronic device, a value indicative of the score.

The operations may include receiving, from a second electronic device, a lookup request including an image of a person of interest, retrieving, based on the image of the person of interest, the one or more items of identifying information, the one or more items of captured metadata, the one or more background data items, and the one or more biometric data items stored in the data record, calculating a validation hash as a function of the retrieved data, searching the blockchain for a hash matching the validation hash, and, in response to a search result indicating that the validation hash matches a hash stored in the blockchain, outputting, to the second electronic device, a value indicative of the score.

Another aspect of the embodiments of the present disclosure is a method for verifying a person's identity. The method may include receiving a registration request from a first electronic device, the registration request including one or more items of identifying information associated with a presumed identity of a person and one or more items of captured metadata indicative of a timing of user inputs entered to the first electronic device by the person during a session associated with the registration request, querying one or more trusted databases based on the one or more items of identifying information to obtain one or more background data items associated with the presumed identity of the person, receiving, from a biometric reader, one or more biometric data items captured from the person during the session, storing a data record associating the one or more items of identifying information, the one or more items of captured metadata, the one or more background data items, and the one or more biometric data items, calculating a hash as a function of the one or more items of identifying information, the one or more items of captured metadata, the one or more background data items, and the one or more biometric data items, storing the hash in a block of a blockchain, deriving a score from the one or more items of captured metadata and the one or more background data items, and generating an embeddable digital badge based on the score.

Another aspect of the embodiments of the present disclosure is a system for verifying a person's identity. The system may include a first electronic device for generating a registration request, the registration request including one or more items of identifying information associated with a presumed identity of a person and one or more items of captured metadata indicative of a timing of user inputs entered to the first electronic device by the person during a session associated with the registration request. The system may include a server for querying one or more trusted databases based on the one or more items of identifying information to obtain one or more background data items associated with the presumed identity of the person. The system may include a biometric reader for generating one or more biometric data items captured from the person during the session. The server may receive the registration request and the one or more biometric data items, store a data record associating the one or more items of identifying information, the one or more items of captured metadata, the one or more background data items, and the one or more biometric data items, calculate a hash as a function of the one or more items of identifying information, the one or more items of captured metadata, the one or more background data items, and the one or more biometric data items, store the hash in a block of a blockchain, derive a score from the one or more items of captured metadata and the one or more background data items, and generate an embeddable digital badge based on the score.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems, methods, and apparatuses for verifying a person's identity. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
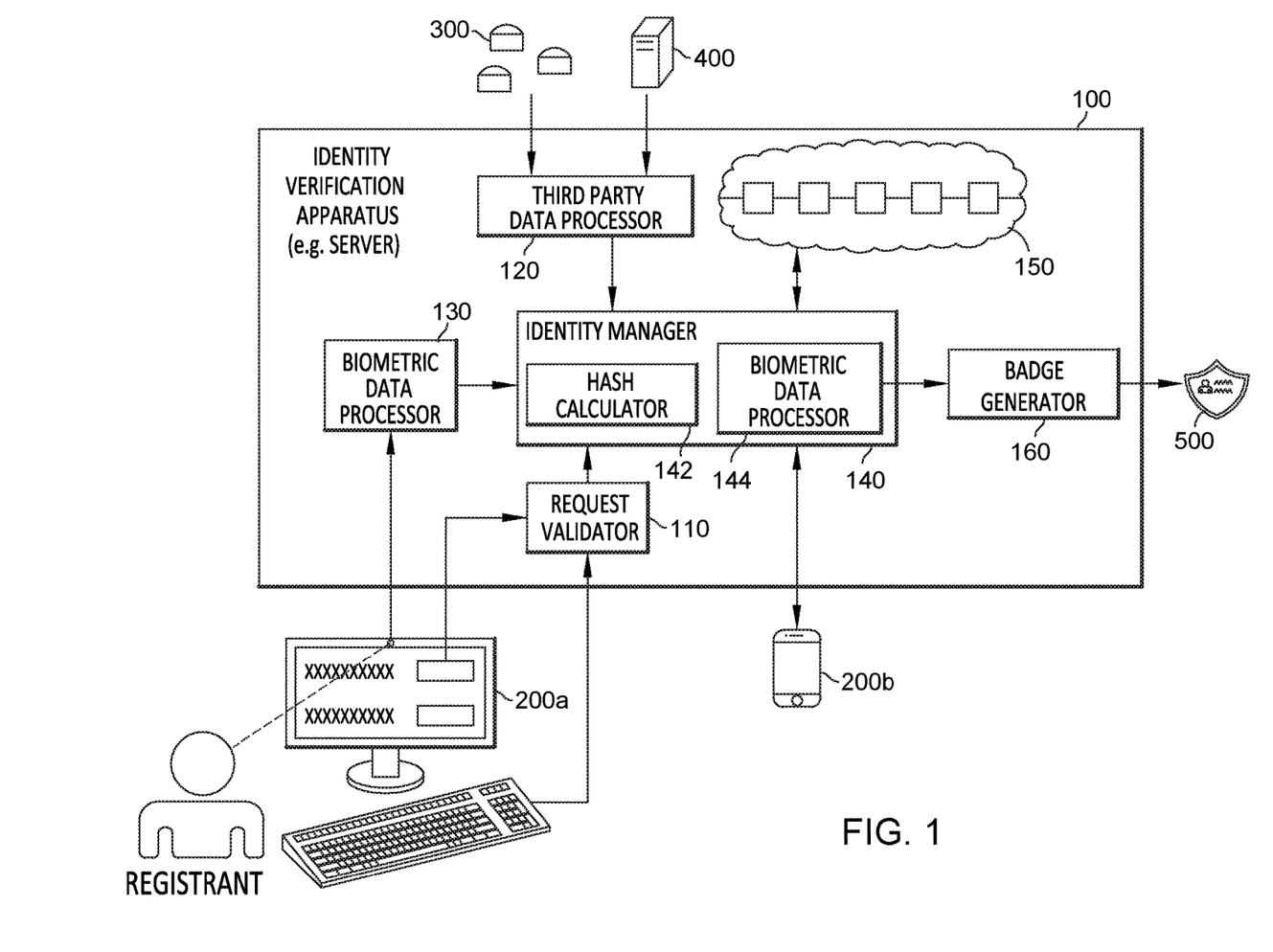
FIG. 1 shows an example identity verification apparatus according to an embodiment of the present disclosure.

FIG. 1 shows an example identity verification apparatus 100 according to an embodiment of the present disclosure. The identity verification apparatus 100 may be a server or a combination of networked servers that interacts with a web browser or mobile application of one or more electronic devices 200a, 200b, one or more external databases 300 such as a department of motor vehicles (DMV) or Federal Bureau of Investigation (FBI) database, and one or more social media servers 400 such as a server operated by Facebook or Twitter. In the example of FIG. 1, a first user of the identity verification apparatus 100, a registrant, would like to establish an authoritative digital certification that he is indeed who he says he is. The registrant may have received a link to a website or mobile application of the identity verification apparatus 100 from another person whom he is interested in dating, who may have asked that the registrant register with the identity verification apparatus 100 as a condition of meeting in person. The registrant may simply want to take his identity into his own hands and receive an authoritative digital badge 500 to demonstrate his authenticity to others, including potential employers. Using the electronic device 200a, which may, for example, be a desktop computer or a mobile device, the registrant completes a registration process on a website or mobile application of the identity verification apparatus 100. The identity verification apparatus 100 then calculates a hash associated with the registrant, stores the hash on a blockchain 150, and derives a score for the registrant. Depending on the score, the identity verification apparatus 100 may generate an embeddable digital badge for the registrant, which may then be displayed on third party websites and serve as an authoritative certification of the registrant's true identity.

The identity verification apparatus 100 may include, in addition to the blockchain 150, a request validator 110, a third party data processor 120, a biometric data processor 130, an identity manager 140, and a badge generator 160. The request validator 110 may receive a registration request from the first electronic device 200a. The registration request may include one or more items of identifying information associated with a presumed identity of a person, namely the registrant. The identifying information may include, for example, a name, a date of birth, a street address, an email address, a phone number, a social media identifier, a social security number or portion thereof (e.g. last four digits), an image, or any combination of such information. The registrant may enter the identifying information by interacting with a graphical user interface (GUI) accessible by a web browser or mobile application installed on the first electronic device 200a. The GUI may mark certain items of identifying information as required (e.g. with an asterisk) while leaving other items of identifying information optional.

During or following the entry of the identifying information, but within the same session, the GUI may capture metadata indicative of a timing of user inputs entered to the first electronic device 200a by the registrant. Such metadata may be included in the registration request and may indicate, for example, a longer than usual hesitation before entering an item of information (which may be indicative of looking up the information rather than knowing it) or a longer than usual hesitation between keystrokes when entering an item of information (which may be indicative of uncertainty with regard to spelling). The registrant may be prompted to answer questions derived from the one or more items of identifying information, and the captured metadata may be indicative of a timing of the registrant's answers to the questions. In some cases, the questions may be derived directly from the entered identifying information. For example, after entering a date of birth, the registrant may be asked "How old will you be in five years?" A long hesitation may indicate that the registrant is calculating an age from the date of birth rather than from his current age, suggesting that he is not really the person that the identifying information belongs to. The question may further be derived from data that is accessible to the identity verification apparatus 100 based on the entered identifying information. For example, after entering a name and address, the request validator 110 may query an internal or third party database (e.g. a Lexis-Nexis database) and generate a question from the retrieved information such as "Who was your previous employer?" A long hesitation may indicate that the registrant is attempting to look up the answer online, again suggesting that he is not really the person that the identifying information belongs to. An inability to answer the question may similarly raise a question as to the person's true identity. An example system that may be employed by the request validator 110 to capture such metadata is IdentityDetect, by Converus, Inc.

Within the same session, the GUI may conduct an integrity assessment of the registrant. For example, a series of questions may be asked that are designed to discern the registrant's legal, ethical, or moral integrity. As a specific example, a scenario may be presented to the registrant asking him what he would do under certain circumstances (e.g. "Would you return the money?"). The registrant's responses, and in some cases metadata indicative of a timing of user inputs, may provide an indication as to the user's honesty or other aspects of integrity. An example system that may be employed by the request validator 110 to conduct such an integrity assessment is IntegrityDetect, by Converus, Inc. The registration request received by the request validator 110 may include the person's responses to such an integrity assessment in addition to the one or more items of identifying information and the captured metadata described above.

When the registrant isn't who he says he is, it is not necessary to expend resources performing a full background check. The results of the background check would not apply to the person requesting the identity certification and the certification should be denied in any event. Therefore, it is contemplated that the request validator 110 may prematurely terminate the registration process based on the captured metadata. To this end, the request validator 110 may compare the captured metadata to a threshold below which it is likely that the registrant is not the true owner of the identifying information. Premature termination may, in some cases, further be based on the registrant's responses to an integrity assessment as described above. Following premature termination, the request validator 110 may further prevent the registrant from submitting a new registration request, effectively locking the registrant out. The registrant may be locked out for a predetermined period of time or indefinitely, for example, by preventing access to the identity verification apparatus 100 by the first electronic device 200a. Alternatively, the request validator 110 may place the lock on the identifying information (e.g. name, image, etc.)

rather than on the first electronic device 200a. In this way, the identity thief may be prevented from circumventing the lockout by using a different electronic device.

Assuming the registration process has not been prematurely terminated by the request validator 110, the third party data processor 120 may query one or more trusted databases 300 based on the one or more items of identifying information to obtain one or more background items associated with the presumed identity of the person. In other words, after a registrant has passed the first hurdle and established with some degree of certainty that he is who he says he is (as may be determined by the request validator 110 as described above), the third party data processor 120 may conduct a full background check by querying the one or more trusted databases 300. The one or more trusted databases 300 may include databases containing federal, state, or municipal public records including, for example, secretary of state databases, department of health databases, court records databases, public utility databases, phone records databases, department of motor vehicles (DMV) databases, Federal Bureau of Investigation (FBI) databases, auto/property insurance records databases, professional licensing databases, data broker databases (e.g. a LexisNexis databases), etc. The third party data processor 120 may further obtain information from one or more social media providers such as Facebook, Twitter, LinkedIn, Instagram, etc. For example, the third party data processor 120 may call an application programming interface (API) associated with a social media provider to obtain one or more social media data items associated with the presumed identity of the person. Social media data items may include, for example, timeline data, friend data, post data, image data, history data, etc. and may quantify, for example, how many connections the person has, how long the person has been active on social media, etc., which may be indicative of the authenticity of the person's identity. It is contemplated that the GUI of the identity verification apparatus 100 may prompt the registrant to authorize one or more social media providers to allow access to such social media data items if necessary.

The biometric data processor 130 may receive, from a biometric reader, one or more biometric data items captured from the person during the session. As noted above, the identity verification apparatus 100 may receive various items of data all within the same session associated with the registration request. In this respect, a session may be initiated when the registrant begins a registration process on the first electronic device 200a via the GUI of the identity verification apparatus 100. The identity verification apparatus 100 may track a current session (e.g. using cookies) and cause the session to timeout after a predetermined period of time (e.g. 30 minutes) and/or after a predetermined period of inactivity (e.g. 2 minutes). By capturing the biometric data during the same session that the identifying information and captured metadata are received, it can be inferred that the biometric data received by the biometric data processor 130 correctly corresponds to the person whose identity has already been validated by the request validator 110. In this way, the possibility that an imposter will register his own biometric data with a stolen identity is greatly reduced relative to conventional systems. The one or more biometric data items may include, for example, fingerprint data, iris scan data, facial recognition data, voice recognition data, etc. The biometric reader used may depend on the particular biometric data item to be collected and may be, for example, a camera of the first electronic device 200a as shown in FIG. 1, a fingerprint scanner, a microphone, etc. The biometric data processor 130 may receive raw biometric data and process the data as needed (e.g. filtering, compression, generation of descriptors, etc.).

With the registration request, the one or more background data items, and the one or more biometric data items having been received by the identity verification apparatus 100, the identity manager 140 may aggregate the various data items to create and manage an authoritative identifier of the registrant's information and an associated score for evaluating the registrant. In this respect, the identity manager 140 may store a data record associating the identifying information of the registration request, the captured metadata of the registration request, the background data items retrieved from the trusted database(s) 300, and the biometric data items received from the biometric reader. The data record for the registrant may further include the registrant's responses to any integrity assessment as described above and/or any social media data items retrieved from the social media server(s) 400. In order to ensure the integrity of the data, a hash calculator 142 of the identity manager 140 may calculate a hash of this same aggregation of data (e.g. a cryptographic hash using an SHA-256 algorithm), which may serve as the primary identifier of the registrant and may be stored by the identity manager 140 locally or remotely in a block of the blockchain 150 (e.g. in one or more containers of a cloud computing platform such as Amazon's Elastic Compute Cloud instances). For example, the hash calculator 142 may calculate a hash as a function of the identifying information, the captured metadata, the background data items, and the biometric data items and may calculate the hash further as a function of responses to any integrity assessment and/or social media data items. In this way, an immutable record of all of the aggregated data may be maintained in perpetuity from the moment of registration. By later validating the data record against the hash stored on the blockchain 150, the identity verification apparatus 100 may indisputably confirm the accuracy of the data record, including the fact that it was collected contemporaneously within the same session.

With the authenticity of the aggregated data being confirmed by the storage of the hash on the blockchain 150, the score derivation engine 144 of the identity manager may derive a score from the data. The score may quantify the confidence that the identity verification apparatus 100 has in the verification of the registrant's identity as well as the history of the person having such presumed identity. In this respect, the score derivation engine 144 may derive the score from the captured metadata indicative of the timing of user inputs and the background data items retrieved from the trusted databases 300. As such, a low score may indicate that there was slightly abnormal hesitation on the part of the registrant during the session that was not enough to cause the request validator 110 to terminate the registration process. A low score may further indicate that the person engaged in criminal or other questionable behavior in the past, as determined from the background data items retrieved from the trusted databases 300. The effect on the score may depend on the nature of the criminal or other activity in question, where a minor infraction may affect the score less significantly than a major crime, especially crimes of violence or deceit. It is further contemplated that particularly troubling crimes or other activity may disqualify the registrant from obtaining a badge 500. The score derivation engine 144 may, for example, cause the score to zero or otherwise flag the score in response to data indicative of such activity.

The score derivation engine 144 may further derive the score from the identifying information and/or the biometric data item(s), where a lower score may be derived in a case where few items of identifying information (e.g. only name and date of birth) or few biometrics (e.g. only an iris scan) were provided by the registrant. Conversely, providing more than the minimum requirements of identifying information and biometrics can result in a higher score for the registrant, as the identity verification apparatus 100 may be able to attest to the truth of the registrant's identity with more confidence. In a case where social media data is retrieved from one or more social media server(s) 400, the score derivation engine 144 may further derive the score from the social media data items. For example, a longer time being active on social media and/or a higher number of friends and other social media contacts may increase the likelihood that the registrant's identity is true, resulting in a higher score.

It is further contemplated that the hash calculator 142 may calculate the hash as a function of the score calculated by the score derivation engine 144. In this case, rather than recalculating the score as needed from the underlying data that has been validated using the blockchain 150, the identity manager 140 may store the originally calculated score in the data record together with the aggregation of data and thereafter confirm the score's authenticity against the hash on the blockchain 150.

The badge generator 160 may generate an embeddable digital badge 500 based on the score derived by the score derivation engine 144. The badge 500 may comply with an Open Badges standard developed by the Mozilla Foundation and may serve as a digital credential evidencing that the registrant's identity has been verified by the provider of the identity verification apparatus 100 serving as the issuer of the badge 500. The badge 500 may be generated in response to the registrant's score being above a threshold. In this way, the identity verification apparatus 100 may employ various rules for awarding badges in order to support the creation of a community of verified people having certain minimum qualities. As described above, the score may be indicative of the confidence that the identity verification apparatus 100 has in the verification of the registrant's identity as well as the history of the person having such presumed identity. For example, a low score may indicate that a person only provided minimal information to verify their identity, that the person engaged in criminal or other questionable behavior in the past, or both. By only issuing badges to registrant's whose scores exceed a threshold (or whose scores are not otherwise flagged as being disqualifying), the identity verification apparatus 100 may serve as a binary "YES/NO" indicator when evaluating a person's trustworthiness. By the same token, if a person is asked to register with the identity verification apparatus 100 and obtain a badge but fails to obtain one or refuses to try, it may similarly suggest that the person has a questionable history or may not be who he says he is.

Figure 2:
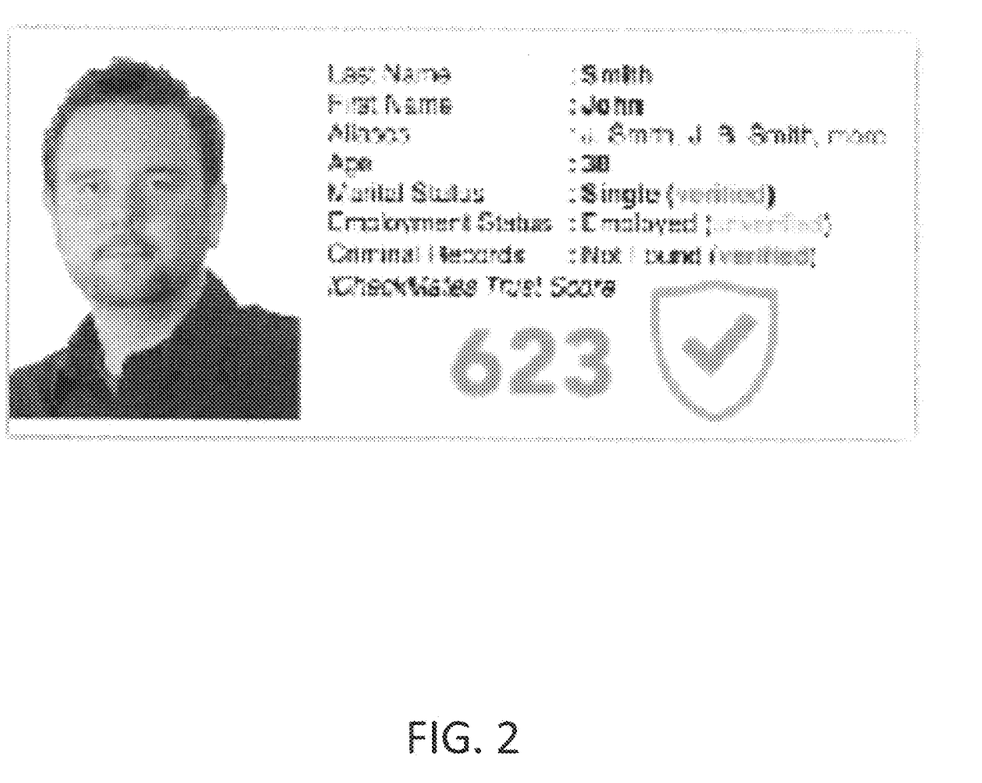
FIG. 2 shows an example badge that may be generated by the identity verification apparatus for a successful registrant.

In addition to the presence of a badge 500 serving as a coarse filter for evaluating a person's trustworthiness, it is also contemplated that the badge 500 may contain a visual representation of the score, such as a number from 1 to 1000. In such case, the badge 500 may provide some additional indication as to whether a person was barely eligible for a badge 500 or earned the badge 500 easily. In this way, the badge 500 may help other people evaluate the level of risk associated with dating or otherwise trusting the person. For example, a more risk averse person, such as someone who has had bad experiences in the past, may choose only to associate with people having scores above a certain number.

FIG. 2 shows an example badge 500 that may be generated by the identity verification apparatus 100 for a successful registrant. Having received the badge 500, the recipient of the badge 500 may display the badge 500 on his social media profile page or other website (e.g. as a widget). The badge 500 may contain a link to a website or mobile application of the identity verification apparatus 100, creating a viral loop that directs more potential registrants to the identity verification apparatus 100. The badge 500 may further contain the recipient's score (e.g. "623") as described above. It is also contemplated that the badge 500 may contain selected information about the recipient of the badge 500 as chosen by the recipient of the badge 500. For example, the badge 500 may display one or more items of information about the recipient that have been verified by the identity verification apparatus 100 as described above. In the example of FIG. 2, the verified information includes the badge recipient's marital status ("Single") and criminal record status ("Not found"). The badge 500 may also display information that has not been verified but that the badge recipient still would like to display. In the example of FIG. 2, the unverified information includes the badge recipient's employment status ("Employed"). A person viewing the badge may find the badge recipient to be trustworthy based on the fact that he has a badge 500 and/or the particular score ("623"), if it is included in the badge 500. The person may therefore be more willing to trust that the unverified information is accurate.

It is contemplated that the badge recipient may select the information to display by logging into a settings page or a personal profile page of a social network provided by the identity verification apparatus 100. In a case where the identify verification apparatus 100 provides a social network, the badge 500 may contain a link to the badge recipient's personal profile page, allowing an interested person to learn more about the badge recipient and potentially connect over the social network. The social network may uniquely consist of people who hold badges 500, effectively serving as a trusted network of credible people with a greatly reduced risk of encountering identity thieves and scammers.

Figure 3:
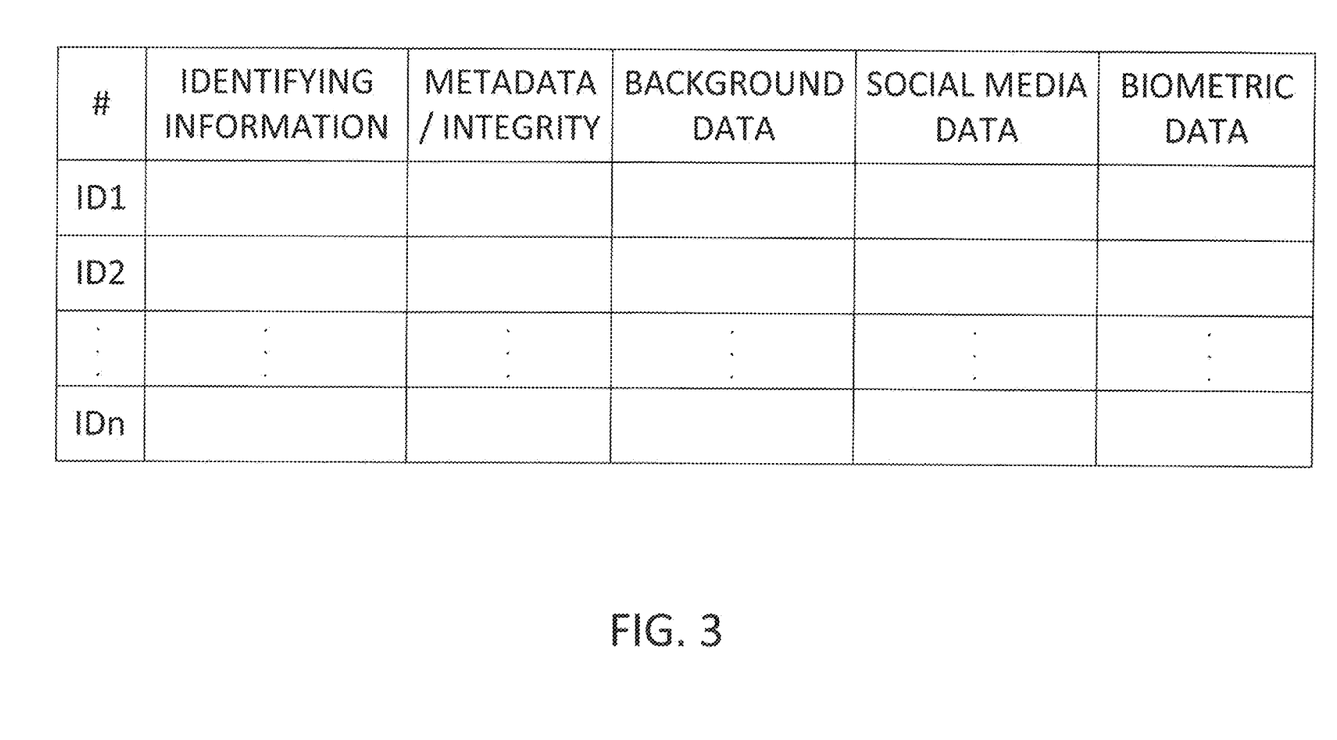
FIG. 3 shows an example data structure associated with a data record that may be stored by an identity manager of the identity verification apparatus.

FIG. 3 shows an example data structure associated with a data record stored by the identity manager 140 of the identity verification apparatus 100. The data record(s) represented by the data structure of FIG. 3 may be stored in a database or other container locally or remotely (e.g. in one or more containers of a cloud computing platform such as Amazon's Elastic Compute Cloud instances) and is illustrated in tabular form to represent associations between various items of data as described above in relation to the operations of the identity verification apparatus 100. For example, a single row of the data structure shown in FIG. 3 may represent a data record as described above, containing all of the aggregated data collected during a registration process of a single registrant identified by a reference (e.g. "ID1"), which may be the hash described above or an arbitrary reference. As shown, the aggregated data associated with each data record (i.e. row) may include, for example, identifying information received by the request validator 110, captured timing metadata and/or integrity assessment data obtained by the request validator 110, background data collected by the third party data processor 120 from one or more trusted databases 300, social media data collected by the third party data processor 120 from one or more social media servers 400, and biometric data captured by a biometric reader and processed by the biometric data processor 130. As discussed above, the data record may additionally include the score derived by the score derivation engine 144 of the identity manager 140. As explained above, since a hash of the contents of the data record is stored in the blockchain 150, the identity verification apparatus 100 may check the integrity of the data record at any time (e.g. periodically, in response to a request, etc.). The identity manager 140 may, for example, calculate a new hash of the data record and compare the new hash to the data in the blockchain 150. If the new hash matches a hash on the blockchain 150, it can be inferred that the data record is the same as it was when the hash on the blockchain 150 was created, i.e. at the time of registration. Conversely, if the new hash does not match any hash on the blockchain 150, it can be inferred that the data record has been altered in some way and is unreliable.

Figure 4:
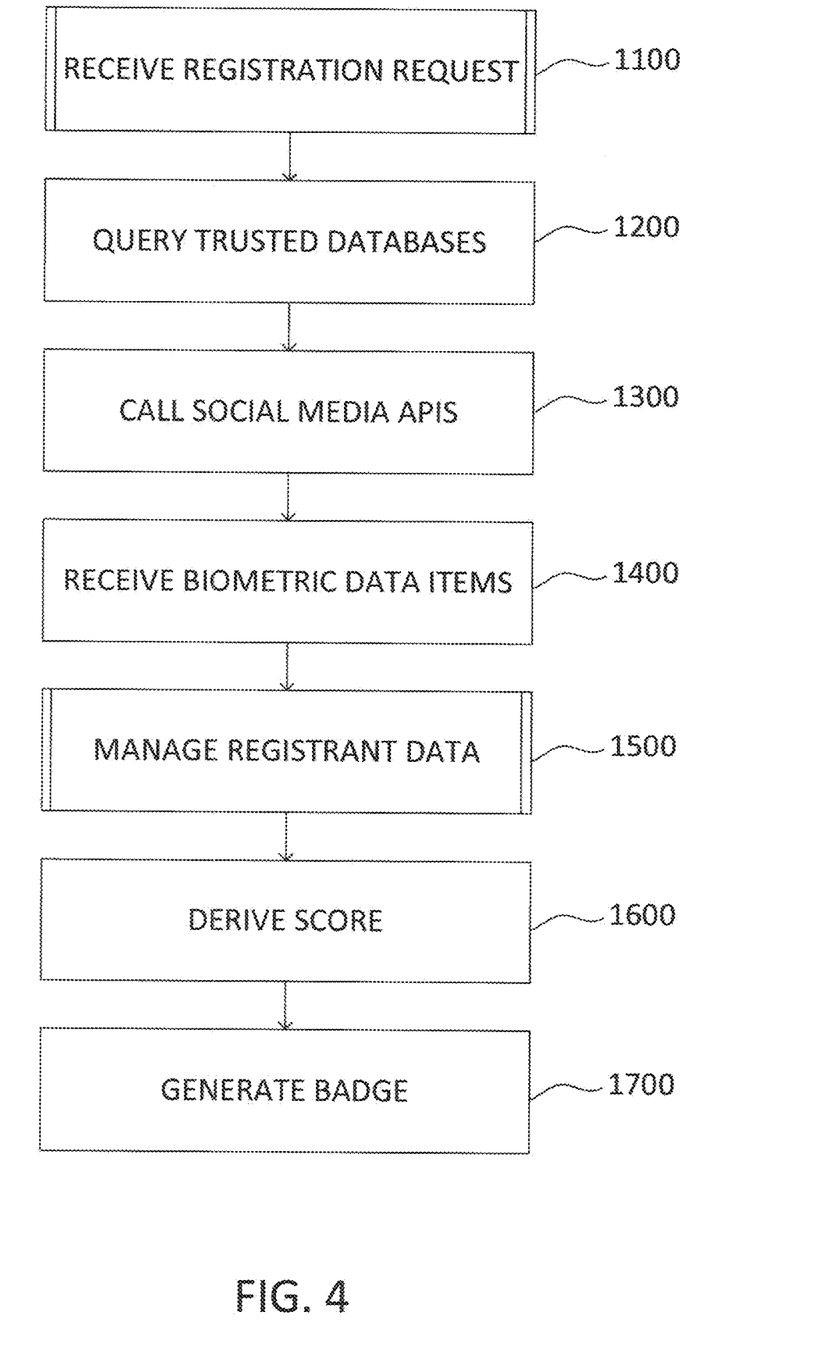
FIG. 4 shows an example operational flow of the identity verification apparatus in relation to generating a badge.
Figure 5:
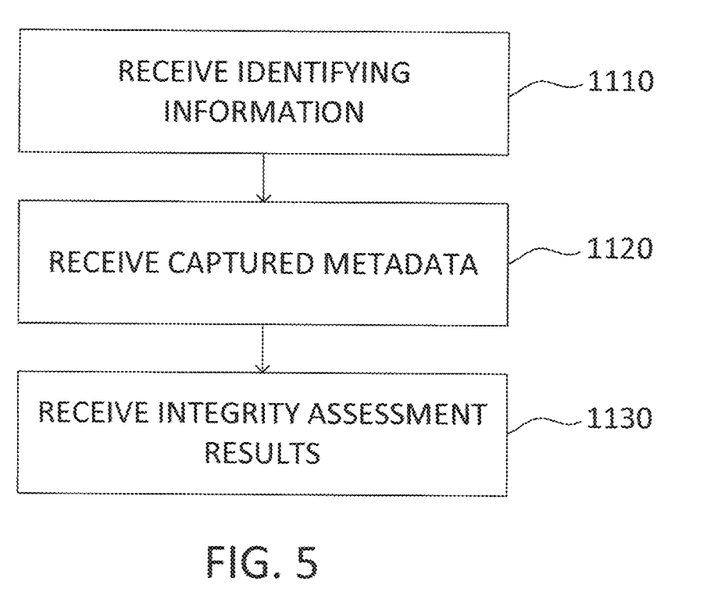
FIG. 5 shows an example operational flow of step 1100 of FIG. 4.
Figure 6:
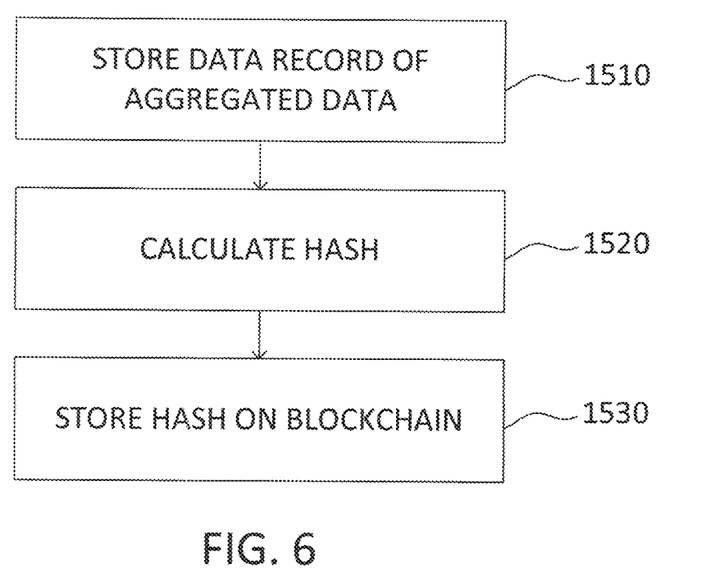
FIG. 6 shows an example operational flow of step 1500 of FIG. 4.

FIG. 4 shows an example operational flow of the identity verification apparatus 100 in relation to generating a badge 500, with FIGS. 5 and 6 showing example subprocesses thereof. The operational flow may begin with the receipt of a registration request by the request validator 110 of the identity verification apparatus 100 (step 1100). As shown in FIG. 5, the receipt of the registration request by the request validator 110 may include receipt of identifying information of the registrant such as name, date of birth, street address, email address, phone number, social media identifier, social security number, image, etc. (step 1110), receipt of captured metadata indicative of the timing of the registrant's user inputs (step 1120), and receipt of the registrant's responses to an integrity assessment (step 1130). Assuming that the registration is not prematurely terminated by the request validator 110 as described above, the operational flow of FIG. 4 may continue with the third party data processor 120 querying one or more trusted databases (step 1200) and calling an API associated with one or more social media providers (step 1300) based on the identifying information of the registration request, as well as with the biometric data processor 130 receiving biometric data captured from the person during the same session associated with the registration request (step 1400).

With the registrant data items of steps 1100-1400 having been collected by the identity verification apparatus 100, the identity manager 140 may take steps to manage the data so as to support the creation of a verifiably accurate correspondence between the different data elements of the registrant (step 1500). In conventional systems, biometrics may be collected for an individual at a time when it cannot be known with certainty that the person is who he says he is. As explained above, biometric registries of this type can have the unwanted effect of making a successful identity thief more dangerous. This is because the person may only need to pass a two-factor authentication prior to registering his own biometric data in relation to a stolen identity. By coupling the collection of personal identifying data and biometric data with the collection of additional data contemplated herein such as captured timing metadata and/or integrity assessment results, the identity verification apparatus 100 can establish a high confidence at a precise moment in time (e.g. a registration session) that the registrant is who he says he is. The identity manager 140 may then manage the data in a way that creates an immutable persistent record of that moment in time. For example, as shown in FIG. 6, the management of the new registrant data by the identity manager may include storing a data record of the aggregated data such as the data record(s) shown in FIG. 3 (step 1510), calculating a hash 1520 as a function of the aggregated data (step 1520), and storing the hash on a blockchain 150 (step 1530). The hash stored on the blockchain 150 may thereafter serve to validate the aggregated data stored in the data record, proving that the data record has not been altered and may still strongly suggest the authentic identity and background information of the registrant as it did at the time of registration.

With the aggregated data having been securely stored in this way, or prior or during the process of managing the aggregated data, the identity manager 140 may further derive a score indicative of the degree of confidence in the registrant's true identity and/or the registrant's past behavior (step 1600). In some cases, as mentioned above, such a score may be used by the identity manager 140 to manage the data, e.g. by calculating the hash as a function of the score. Lastly, the badge generator 160 of the identity verification apparatus 100 may generate a badge 500 for the registrant based on the score as described above (step 1700). In this way, the disclosed subject matter may constitute, in some embodiments, a decentralized method of storing human experiences, biometrics and social media information that uniquely identifies a person leveraging blockchain technology, where each individual is identified by a progressive hash serving as a primary identifier for ownership of a person's experiences which are managed via a distributed ledger such as a blockchain.

Figure 7:
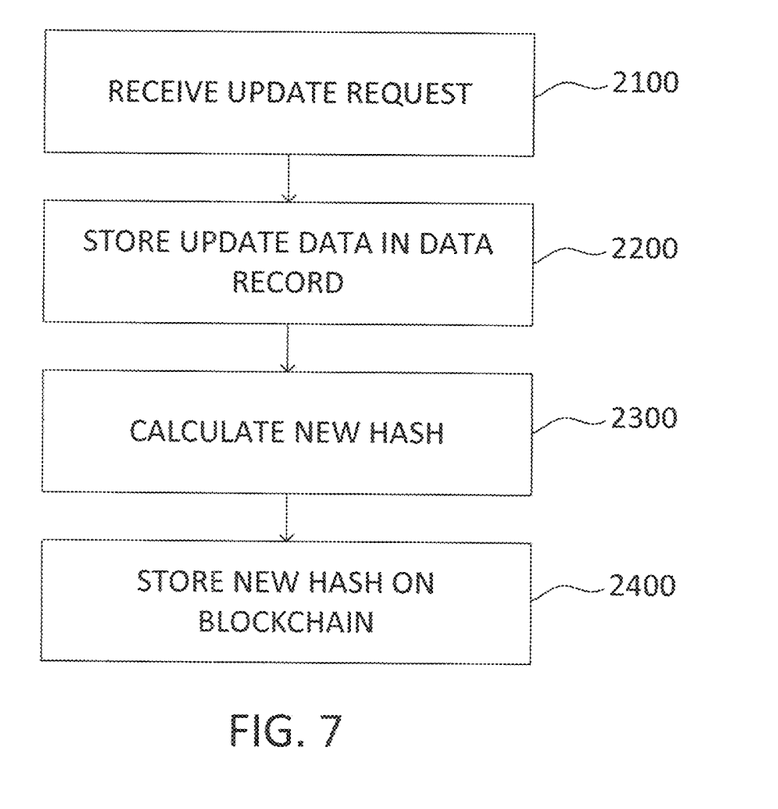
FIG. 7 shows an example operational flow of the identity verification apparatus in relation to updating identifying information of a badge holder.

FIG. 7 shows an example operational flow of the identity verification apparatus 100 in relation to updating identifying information of a badge recipient. It is contemplated that, from time to time, a successful registrant who has received a badge 500 may wish to update his identifying information. For example, the badge recipient may have moved and may need to update his street address or may have gotten married and wish to change his name. Under these circumstances, the badge recipient may simply log in to the identity verification apparatus 100 using a login credential created at the time of registration and associated with the presumed identity of the registrant (e.g. stored by the identity verification apparatus 100 in association with an account created for the registrant at the time of registration). Using a GUI of the identity verification apparatus 100, the badge recipient wishing to update his information may submit an update request including the login credential and one or more items of update data indicative of the changed information. The request validator 110 may thus receive the update request from an electronic device such as the first electronic device 200*a* (step 2100).

In response to receipt of the update request, the identity manager 140 may store the update data in the data record associated with the badge recipient (step 2200), e.g. a data record as described in relation to FIG. 3. For example, a new column including the update data may be appended to the data record so as not to alter the original data of the data record. The hash calculator 142 of the identity manager 140 may then calculate a new hash as a function of the update data and the hash stored in the blockchain 150 (step 2300). This may be done, for example, by first recalculating the hash from the originally stored aggregated data in the data record (i.e. without the update data) and comparing the recalculated hash to the blockchain 150 to make sure there is a match with the original hash stored on the blockchain, and then thereafter calculating the new hash as a function of the recalculated hash and the update data. The identity manager 140 may then store the new hash in a new block of the blockchain 150 (step 2400). As more and more updates are made to the data record in this way, a record of each individual update may be represented by a hash on the blockchain 150 for future validation.

Figure 8:
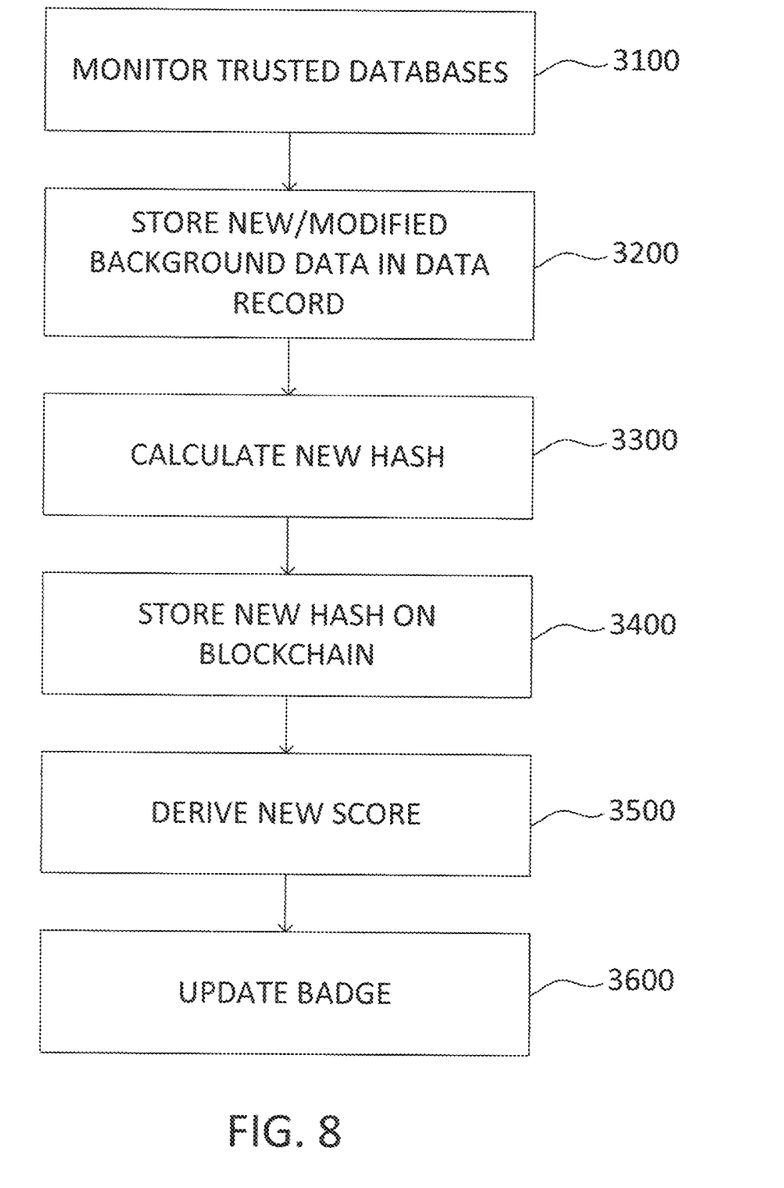
FIG. 8 shows an example operational flow of the identity verification apparatus in relation to monitoring background data associated with a badge holder.

FIG. 8 shows an example operational flow of the identity verification apparatus 100 in relation to monitoring background data associated with a badge holder. Similar to the case of a badge holder wishing to update his personal information, it is further contemplated that the identity verification apparatus 100 may monitor the background data of each badge holder for changes in the badge holder's criminal record, etc. In this regard, the third party data processor 120 of the identity verification apparatus 100 may monitor the one or more trusted databases 300 and/or the one or more social media servers 400 for new or modified background data items (or new or modified social media data items) associated with the badge holder (step 3100). Such monitoring may be done regularly at predetermined intervals, the length of which may vary depending on the data source in question. In response to discovering new or modified data, the identity manager 140 may, just as described above in relation to update data, store the new or modified data in the data record associated with the badge recipient (step 3200), e.g. a data record as described in relation to FIG. 3. For example, a new column including the new/modified data may be appended to the data record so as not to alter the original data of the data record. The hash calculator 142 of the identity manager 140 may then calculate a new hash as a function of the new/modified data and the hash stored in the blockchain 150 (step 3300). This may be done, for example, by first recalculating the hash from the originally stored aggregated data in the data record (i.e. without the new/modified data) and comparing the recalculated hash to the blockchain 150 to make sure there is a match with the original hash stored on the blockchain, and then thereafter calculating the new hash as a function of the recalculated hash and the new/modified data. The identity manager 140 may then store the new hash in a new block of the blockchain 150 (step 3400). As new/modified data is added to the data record in this way, a record of each change may be represented by a hash on the blockchain 150 for future validation.

Since the badge recipient's score is derived in part from the background data, the addition of new or modified background data to the data record may further entail a change in the score. To this end, the score derivation engine 144 of the identity manager 140 may derive a new score at least in part from the new or modified background data items (step 3500). The badge generator 160 may update the embeddable digital badge 500 based on the new score accordingly (step 3600). In a particularly egregious case (e.g. the commission of a crime), the updating of the badge 500 may including revoking the badge 500 entirely. For example, the badge generator 160 may cancel the badge 500 in response to the new score being below a threshold. In other cases, the badge generator 160 may update the badge 500 to contain a visual representation of the new score.

It should be noted that the steps of deriving a new score and updating the badge 500 may also apply in other scenarios, not only when there is new or modified background data associated with a badge recipient. For example, in a case where the score is partly derived from the identifying data (e.g. name, date of birth, etc.), then the update to the identifying data described in relation to FIG. 7 may itself result in a newly derived score and updated badge 500. This may happen, for example, when the badge recipient wishes to update his identifying information to add more items of identifying information (e.g. a social security number, an image, etc.), resulting in a higher degree of confidence that the badge recipient is who he says he is and, consequently, a higher score. Therefore, it should be understood that steps 3500 and 3600 of FIG. 8 may also apply in the example of FIG. 7, as well as under any other circumstances where the score may change due to a change in a badge recipient's data record. In some cases, such changes in score may further affect the calculation of the hash as described above.

Figure 9:
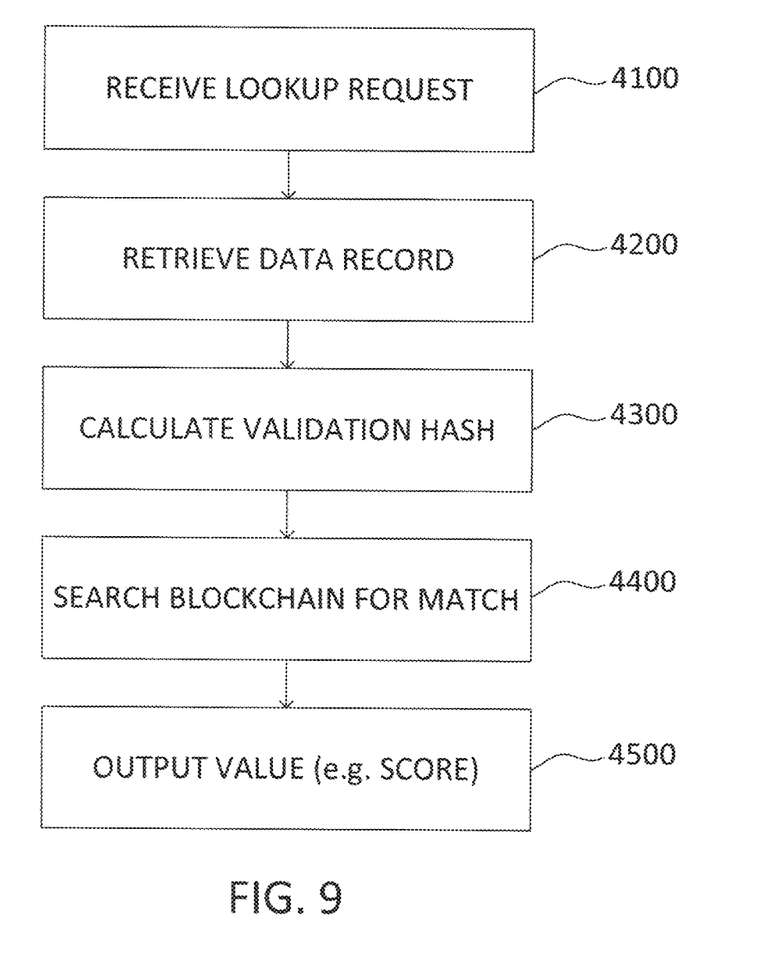
FIG. 9 shows an example operational flow of the identity verification apparatus in relation to responding to a lookup request.

FIG. 9 shows an example operational flow of the identity verification apparatus 100 in relation to responding to a lookup request. Referring back to FIG. 1, the identity verification apparatus 100 may from time to time receive requests from electronic devices 200*b* from interested people wishing to look up registrants of the identity verification apparatus 100. For example, a person may meet someone in a bar, learn his name or capture his image, and wish to know whether he is who he says he is or whether he is a safe person to leave the bar with. As another example, an employer may wish to look up a potential employee. In this respect, the identity verification apparatus 100 may be used not only as an issuer of badges 500 but as an information source for interested parties. Owing to the viral nature of acquiring new registrants, where a badge 500 may link an interested person back to a website or mobile application belonging to a provider of the identity verification apparatus 100, it is contemplated that, over time, many people will have registered or attempted to register with the identify verification apparatus 100. The identity verification apparatus 100 may maintain the data not only of successful registrants but also that of unsuccessful registrants to whom a badge 500 was never issued because of a low score.

Continuing with the example of the person in the bar, the interested person may look up the person of interest discreetly (e.g. in the bathroom) or overtly ("hold on a second while I look you up") by submitting a lookup request to the identity verification apparatus 100. The lookup request may include whatever information is known, for example, any combination of name, image, or any other data that may match to the identifying information of a registrant of the identity verification apparatus 100. Upon receiving the lookup request (step 4100), the identity manager 140 may search for and retrieve a data record matching the information included in the lookup request (step 4200). For example, referring back to FIG. 3, the retrieved data record may include identifying information or biometric data matching the information included in the lookup request. Once the correct data record is found, the identity manager 140 may then validate the data record against the blockchain to establish that the data is accurate and has not been altered since it was originally created. For example, the hash calculator 142 of the identity manager 140 may calculate a validation hash as a function of the retrieved data (step 4300) and the identity manager 140 may search the blockchain 150 for a matching hash (step 4400).

As explained above, if the hashes match, it can be inferred that the data has not been altered. In this regard, it should be noted that the hashing algorithm can be devised so that collisions are extremely unlikely if not impossible, such that a match is practically impossible in the event that the data has been altered. Since the original data record represented a correspondence between the identifying information, the background data, the biometric data, and the collected timing metadata, it can be inferred that the aggregated data truly all belonged to the same person at the time of registration and was not the result of an identity theft. Having validated the data record against the blockchain 150, the identity manager 140 may output any of the data of the data record (e.g. the identifying information, the background data, etc.) or calculate a score from the data record with relative certainty that the information is correct. For example, the score derivation engine 144 of the identity manager 140 may calculate a score based on the validated data record (or alternatively the score may be part of the validated data record as described above), and the operational flow may end with the identity manager 140 outputting a value based on the score (step 4500). The requester may receive the score itself or, for example, just a binary "YES/NO" output indicating whether the score exceeded a threshold. In this way, the identity verification apparatus 100 may act as a trusted information source in addition to an issuer of identity certifications (e.g. badges 500).

Figure 10:
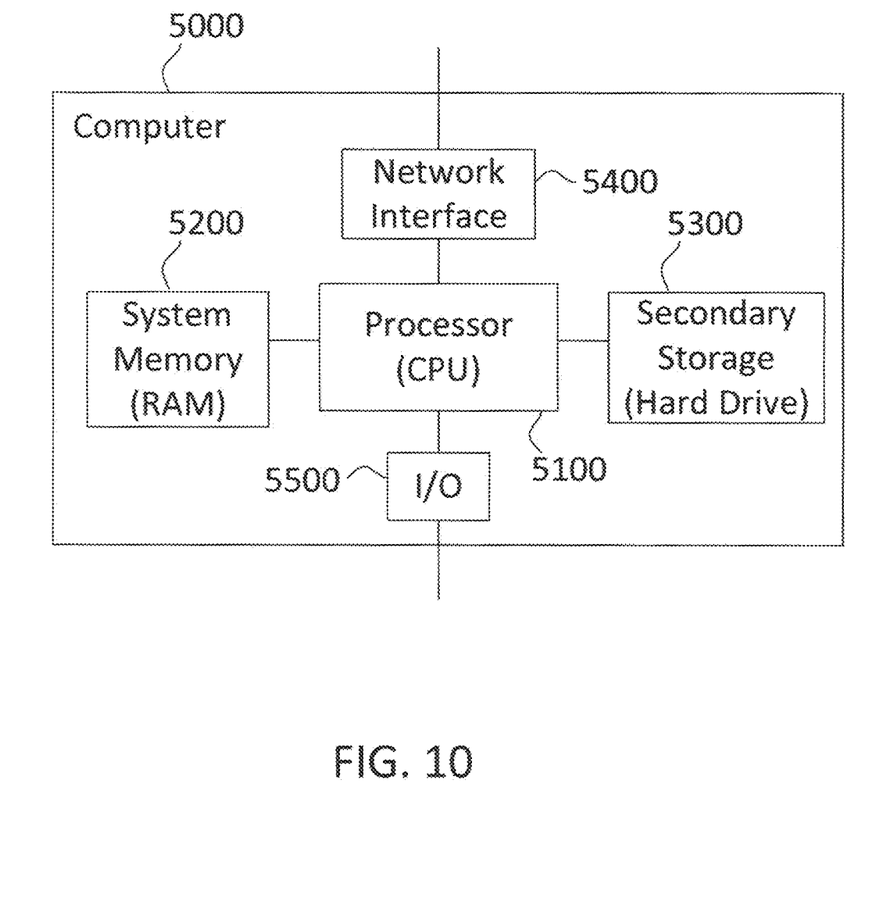
FIG. 10 shows an example of a computer in which the identity verification apparatus, the operational flows of FIGS. 4-9, and/or other embodiments of the disclosed subject matter may be wholly or partly embodied.

FIG. 10 shows an example of a computer in which the identity verification apparatus, the operational flows of FIGS. 4-9, and/or other embodiments of the disclosed subject matter may be wholly or partly embodied. As shown in FIG. 10, the computer 5000 may include a processor (e.g. a CPU) 5100, a system memory (e.g. RAM) 5200, which may be connected by a dedicated memory channel to the processor 5100 and temporarily stores results of data processing operations performed by the processor 5100, and a hard drive or other secondary storage device 5300. The processor 510 may execute one or more computer programs, which may be tangibly embodied along with an operating system in a computer-readable medium, e.g., the secondary storage device 5300. The operating system and computer programs may be loaded from the secondary storage device 5300 into the system memory 5200 to be executed by the processor 5100. The computer 5000 may further include a network interface 5400 for network communication between the computer 5000 and external devices (e.g. over the Internet), such as user devices 200*a*, 200*b* accessing the identity verification apparatus 100 and associated GUIs using a mobile application or web browser, as well as trusted database(s) 300, social media servers 400, and/or remote cloud storage servers as described above. Local user interaction with the computer 5000 may be via one or more I/O devices 5500, such as a display, mouse, keyboard, etc.

The computer programs may comprise program instructions which, when executed by the processor 5100, cause the processor 5100 to perform operations in accordance with the various embodiments of the disclosed subject matter. For example, a program that is installed in the computer 5000 may cause the computer 5000 to function as an apparatus such as the identity verification apparatus 100 of FIG. 1, e.g., causing the computer 5000 to function as some or all of the sections, components, elements, databases, storages, engines, managers, calculators, generators, validators, processors, etc. of the apparatus 100 of FIG. 1 (e.g., request validator 110, the identity manager 140, etc.). A program that is installed in the computer 5000 may also cause the computer 5000 to perform an operational flow such as those shown in FIG. 4-9 or a portion thereof, e.g., causing the computer 5000 to perform one or more of the steps of FIG. 4 (e.g., "receive registration request" 1100, "manage registrant data" 1500, etc.).

The above-mentioned computer programs may be provided to the secondary storage 5300 by or otherwise reside on an external computer-readable medium such as a DVD-ROM, an optical recording medium such as a CD or Blu-ray Disk, a magneto-optic recording medium such as a magneto-optical (MO) disc, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer 5000 via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-transitory program storage medium on which are stored instructions executable by a processor or programmable circuit to perform operations for verifying a person's identity, the operations comprising:
receiving a registration request from a first electronic device, the registration request including one or more items of identifying information associated with a presumed identity of a person and one or more items of captured metadata indicative of a timing of user inputs entered to the first electronic device by the person during a session associated with the registration request;
querying one or more trusted databases based on the one or more items of identifying information to obtain one or more background data items associated with the presumed identity of the person;
receiving, from a biometric reader, one or more biometric data items captured from the person during the session;
storing a data record associating the one or more items of identifying information, the one or more items of captured metadata, the one or more background data items, and the one or more biometric data items;
calculating a hash as a function of the one or more items of identifying information, the one or more items of captured metadata, the one or more background data items, and the one or more biometric data items;
storing the hash in a block of a blockchain;
deriving a score from the one or more items of captured metadata and the one or more background data items; and
generating an embeddable digital badge based on the score.

2. The non-transitory program storage medium of claim 1, wherein the one or more items of identifying information includes one or more items selected from the group consisting of: a name, a date of birth, a street address, an email address, a phone number, a social media identifier, a social security number or portion thereof, and an image.

3. The non-transitory program storage medium of claim 1, wherein the operations further comprise prompting the person to answer questions derived from the one or more items of identifying information, the one or more items of captured metadata including metadata indicative of a timing of the person's answers to the questions.

4. The non-transitory program storage medium of claim 1, wherein the registration request further includes the person's responses to an integrity assessment.

5. The non-transitory program storage medium of claim 1, wherein the operations further comprise terminating a registration process based on the captured metadata prior to said querying.

6. The non-transitory program storage medium of claim 5, wherein the operations further comprise preventing the person from submitting a new registration request in response to said terminating.

7. The non-transitory program storage medium of claim 1, wherein the one or more trusted databases includes a trusted database selected from the group consisting of: a department of motor vehicles (DMV) database and a Federal Bureau of Investigation (FBI) database.

8. The non-transitory program storage medium of claim 1, wherein the operations further comprise:
calling an application programming interface (API) associated with a social media provider to obtain one or more social media data items associated with the presumed identity of the person, wherein
the hash is calculated as a function of the one or more social media data items,
the one or more social media data items are stored in association with the hash, and
the score is further derived from the one or more social media data items.

9. The non-transitory program storage medium of claim 1, wherein the one or more biometric data items includes one or more items selected from the group consisting of: fingerprint data, iris scan data, facial recognition data, and voice recognition data.

10. The non-transitory program storage medium of claim 1, wherein the score is further derived from either or both of the one or more items of identifying information and the one or more biometric data items.

11. The non-transitory program storage medium of claim 1, wherein the embeddable digital badge is generated in response to the score being above a threshold.

12. The non-transitory program storage medium of claim 1, wherein the embeddable digital badge contains a visual representation of the score.

13. The non-transitory program storage medium of claim 1, wherein the operations further comprise:
receiving an update request from the first electronic device, the update request including a login credential associated with the presumed identity of the person and one or more items of update data indicative of a change in the identifying information associated with the presumed identity of the person;
storing the one or more items of update data in the data record;
calculating a new hash as a function of the one or more items of update data and the hash stored in the blockchain; and
storing the new hash in a new block of the blockchain.

14. The non-transitory program storage medium of claim 1, wherein the operations further comprise:
monitoring the one or more trusted databases for new or modified background data items associated with the presumed identity of the person;
storing the new or modified background data items in the data record;
calculating a new hash as a function of the new or modified background data items and the hash stored in the blockchain;
storing the new hash in a new block of the blockchain;
deriving a new score at least in part from the new or modified background data items; and
updating the embeddable digital badge based on the new score.

15. The non-transitory program storage medium of claim 14, wherein said updating includes canceling the embeddable digital badge in response to the new score being below a threshold.

16. The non-transitory program storage medium of claim 14, wherein the updated embeddable digital badge contains a visual representation of the new score.

17. The non-transitory program storage medium of claim 1, wherein the operations further comprise:
receiving, from a second electronic device, a lookup request including a name of a person of interest;
retrieving, based on the name of the person of interest, the one or more items of identifying information, the one or more items of captured metadata, the one or more background data items, and the one or more biometric data items stored in the data record;
calculating a validation hash as a function of the retrieved data;
searching the blockchain for a hash matching the validation hash; and,
in response to a search result indicating that the validation hash matches a hash stored in the blockchain, outputting, to the second electronic device, a value indicative of the score.

18. The non-transitory program storage medium of claim 1, wherein the operations further comprise:
receiving, from a second electronic device, a lookup request including an image of a person of interest;
retrieving, based on the image of the person of interest, the one or more items of identifying information, the one or more items of captured metadata, the one or more background data items, and the one or more biometric data items stored in the data record;
calculating a validation hash as a function of the retrieved data;
searching the blockchain for a hash matching the validation hash; and,
in response to a search result indicating that the validation hash matches a hash stored in the blockchain, outputting, to the second electronic device, a value indicative of the score.

19. A method for verifying a person's identity, the method comprising:
receiving a registration request from a first electronic device, the registration request including one or more items of identifying information associated with a presumed identity of a person and one or more items of captured metadata indicative of a timing of user inputs entered to the first electronic device by the person during a session associated with the registration request;
querying one or more trusted databases based on the one or more items of identifying information to obtain one or more background data items associated with the presumed identity of the person;
receiving, from a biometric reader, one or more biometric data items captured from the person during the session;
storing a data record associating the one or more items of identifying information, the one or more items of captured metadata, the one or more background data items, and the one or more biometric data items;
calculating a hash as a function of the one or more items of identifying information, the one or more items of captured metadata, the one or more background data items, and the one or more biometric data items;
storing the hash in a block of a blockchain;

deriving a score from the one or more items of captured metadata and the one or more background data items; and generating an embeddable digital badge based on the score.

20. A system for verifying a person's identity, the system comprising:

a first electronic device for generating a registration request, the registration request including one or more items of identifying information associated with a presumed identity of a person and one or more items of captured metadata indicative of a timing of user inputs entered to the first electronic device by the person during a session associated with the registration request;

a server for querying one or more trusted databases based on the one or more items of identifying information to obtain one or more background data items associated with the presumed identity of the person; and a biometric reader for generating one or more biometric data items captured from the person during the session;

wherein the server receives the registration request and the one or more biometric data items, stores a data record associating the one or more items of identifying information, the one or more items of captured metadata, the one or more background data items, and the one or more biometric data items, calculates a hash as a function of the one or more items of identifying information, the one or more items of captured metadata, the one or more background data items, and the one or more biometric data items, stores the hash in a block of a blockchain, derives a score from the one or more items of captured metadata and the one or more background data items, and generates an embeddable digital badge based on the score.

* * * * *